(12) United States Patent
Chen

(10) Patent No.: US 10,145,430 B2
(45) Date of Patent: Dec. 4, 2018

(54) BRAKE DISK

(71) Applicant: Hui-Chuan Chen, Taichung (TW)

(72) Inventor: Hui-Chuan Chen, Taichung (TW)

( * ) Notice: Subject to any disclaimer, the term of this patent is extended or adjusted under 35 U.S.C. 154(b) by 4 days.

(21) Appl. No.: 15/397,299

(22) Filed: Jan. 3, 2017

(65) Prior Publication Data

US 2017/0114846 A1    Apr. 27, 2017

Related U.S. Application Data

(63) Continuation-in-part of application No. 14/795,372, filed on Jul. 9, 2015.

(51) Int. Cl.
*F16D 65/12* (2006.01)
*F16D 65/02* (2006.01)

(52) U.S. Cl.
CPC .... *F16D 65/123* (2013.01); *F16D 2065/1316* (2013.01); *F16D 2065/1396* (2013.01)

(58) Field of Classification Search
CPC ..... F16D 2065/1392; F16D 2065/1316; F16D 2065/1368; F16D 2065/1348; F16D 65/12; F16D 65/123
USPC .......................................... 411/373
See application file for complete search history.

(56) References Cited

U.S. PATENT DOCUMENTS

| | | |
|---|---|---|
| 1,867,736 A | 7/1932 | Finkeldey |
| 4,630,168 A | 12/1986 | Hunt |
| 4,848,521 A | 7/1989 | Izumine |
| 5,249,836 A | 10/1993 | Stanesic et al. |
| 5,503,465 A | 4/1996 | Price et al. |
| 5,520,269 A | 5/1996 | Yamamoto et al. |
| 5,997,229 A | 12/1999 | Akers |
| 6,336,531 B1 | 1/2002 | Chou |
| 7,040,466 B2 | 5/2006 | Saame et al. |
| 7,762,379 B2 | 7/2010 | Fujita et al. |
| 8,474,580 B2 | 7/2013 | Spacek |
| 2006/0080821 A1 | 4/2006 | Yamamoto et al. |
| 2008/0093184 A1 | 4/2008 | Freeman |
| 2010/0282551 A1 | 11/2010 | Ruopp et al. |
| 2012/0097491 A1 | 4/2012 | Yamanaka et al. |

FOREIGN PATENT DOCUMENTS

JP    61-098134 A   *   5/1986   ............. H02K 7/102
TW    M462809         10/2013

* cited by examiner

*Primary Examiner* — Xuan Lan Nguyen
(74) *Attorney, Agent, or Firm* — Muncy, Geissler, Olds & Lowe, P.C.

(57) ABSTRACT

A brake disk includes: a disk portion, having a first side face and a second side face facing opposite to the first side face, the first side face being for being assembled with a wheel and facing the wheel, the disk portion including an inner annular member and an outer annular member, the inner annular member being circumferentially formed with a first assembling mechanism, the outer annular member having a second assembling mechanism, the first assembling mechanism and the second assembling mechanism being correspondingly connected with each other; at least two connecting assemblies, being connected with the first assembling mechanism and the second assembling mechanism respectively, each connecting assembly including a helical spring, the helical spring being on the first side face and abutting against between the connecting assembly and the first side face.

15 Claims, 5 Drawing Sheets

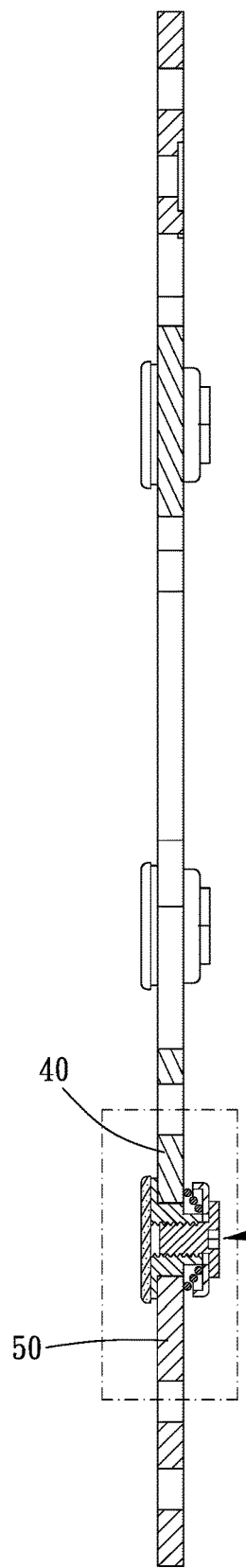
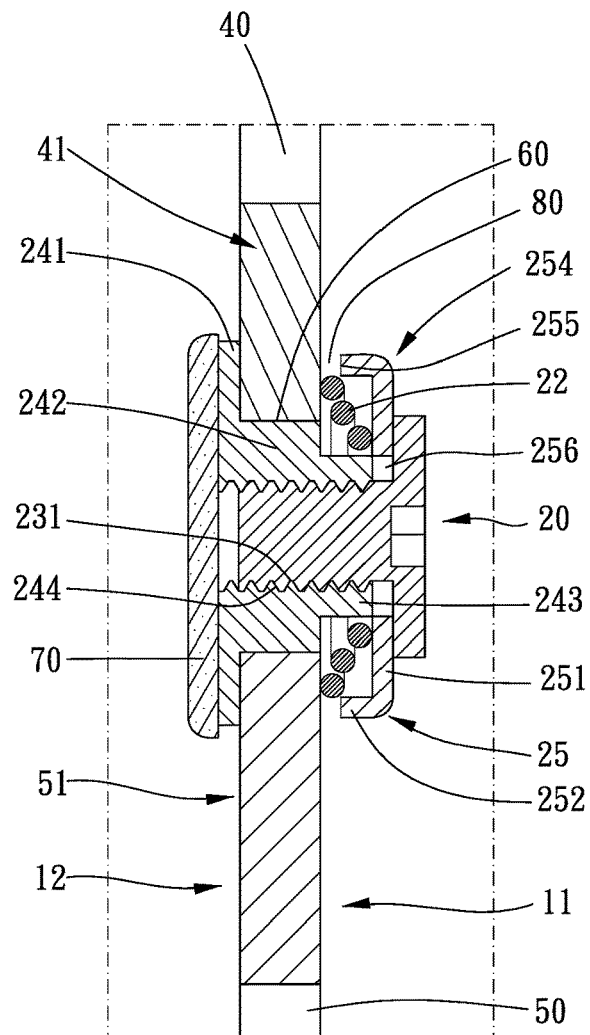
FIG. 5
FIG. 4

BRAKE DISK

FIELD OF THE INVENTION

The present invention is a CIP of application Ser. No. 14/795,372, filed Jul. 9, 2015, the entire contents of which are hereby incorporated by reference.

BACKGROUND OF THE INVENTION

Description of the Prior Art

Usually, a conventional brake disk as disclosed in TWM462809 mainly includes an inner plate, a plurality of fixing members and an outer ring. The inner plate is formed with a plurality of connecting slots in equal intervals at an outer edge thereof, and two ends of the connecting slot have a blocking face and are formed with a through hole respectively. The outer ring is protrusively formed with a plurality of connecting portions in equal intervals at an inner edge thereof and is formed with a pass hole. The connecting portion is arranged in the connecting slot, and a thickness of the connecting portion is smaller than a width of the connecting slot. The fixing member is disposed through the through hole and the pass hole via an end having an engaging slot, and a C-ring is engaged with the engaging slot of the fixing member.

However, the above-mentioned structure has great thickness axially (including the thicknesses of the inner plate and the outer ring); therefore, a user needs to consider the spatial restriction when assembling the brake disk. In addition, the above-mentioned structure cannot move repositionably, and gaps among members make the members collide and abrade with one another easily.

US20100282551 fails to teach or suggest that the spring is a conical coil spring and that the helical spring continuously annularly abutting against the first assembling mechanism of the inner annular member and the second assembling mechanism of the outer annular member on a same plane. US20100282551 discloses that the spring is a "corrugated spring" but not a "conical coil spring". US20100282551 discloses a conventional structure, and it therefore has the technical problem "the corrugated spring or wave spring has small supporting area, poor stability and poor elasticity" which the present invention is set forth to solve since the corrugated spring or wave spring has plural convex portions which are annularly arranged in intervals so that the corrugated spring or wave spring can just discontinuously (not continuously annularly) abut against the inner and outer annular members.

It is noted that the securing disk is a flat member and has no circumferential wall, so that the securing disk cannot receive the corrugated spring and cannot restrict radial stretch of the corrugated spring, dust, particles or the like can come into the gap between the flat securing disk and the rings easily, and the corrugated spring is easy to damage. In other words, the flat disk and the corrugated spring have no radial interaction therebetween. Furthermore, the disk is fixedly radially engaged within the bolt and therefore cannot be adjusted or move relative the bolt, and thus the elastic flexibility of the inner and outer disks due to the elastic force applied thereto is not adjustable.

U.S. Pat. No. 7,040,466 discloses that the spring is a cylindrical coil spring and that the inner annular member and outer annular member are connected with a bolt and axially restricted by the bolt. The bolt allows only relative radial movement of the inner annular member and outer annular member. That is, the inner annular member and outer annular member cannot move axially relative to each other. The coils of the cylindrical coil spring can stack when depressed so that it is thick. The interaction of the cylindrical coil spring with the inner annular member and outer annular member is to bias the inner annular member and outer annular member to move away from each other in the radial direction for avoiding high temperature loads. U.S. Pat. No. 7,040,466 does not teach or suggest interaction of the spring with the inner and outer annular members to allow axial floating movement between the inner and outer annular members for good and real-time frictional contact of the outer annular member with the brake disk.

The present invention has arisen to mitigate and/or obviate the afore-described disadvantages.

SUMMARY OF THE INVENTION

The major object of the present invention is to provide a brake disk, which has members disposed inwardly to prevent the members from being rusted and damaged due to dust or water from outside. In addition, a side of an inner annular member and a side of an outer annular member are on a same plane by the first side face, and an other side of the inner annular member and an other side of the outer annular member are disposed on a same plane by the second side face so as to decrease a thickness of the brake disk; a helical spring may be a conical coil spring to further decrease a volume of the brake disk after the conical coil spring is compressed; the helical spring may abut against the same side of the inner and outer annular members to float, and the helical spring has greater supporting area and flexibility to float stably and elastically; the helical spring may be received in the spacing member to be position-restricted and protected; and the brake disk has an identification portion to prevent misassembling.

To achieve the above and other objects, a brake disk is provided, including: a disk portion, having a first side face and a second side face facing opposite to the first side face, the first side face being for being assembled with a wheel and facing the wheel, the disk portion including an inner annular member and an outer annular member, the inner annular member being circumferentially formed with a first assembling mechanism, the outer annular member having a second assembling mechanism, the first assembling mechanism and the second assembling mechanism being correspondingly connected with each other; at least two connecting assemblies, being connected with the first assembling mechanism and the second assembling mechanism respectively, each said connecting assembly including a helical spring, each said helical spring being on the first side face and abutting against between the connecting assembly and the first side face.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 4 is a cross-sectional drawing of the preferred embodiment of the present invention;

FIG. 5 is a partial cross-sectional drawing of the preferred embodiment of the present invention;

DETAILED DESCRIPTION OF THE PREFERRED EMBODIMENTS

Figure 1:
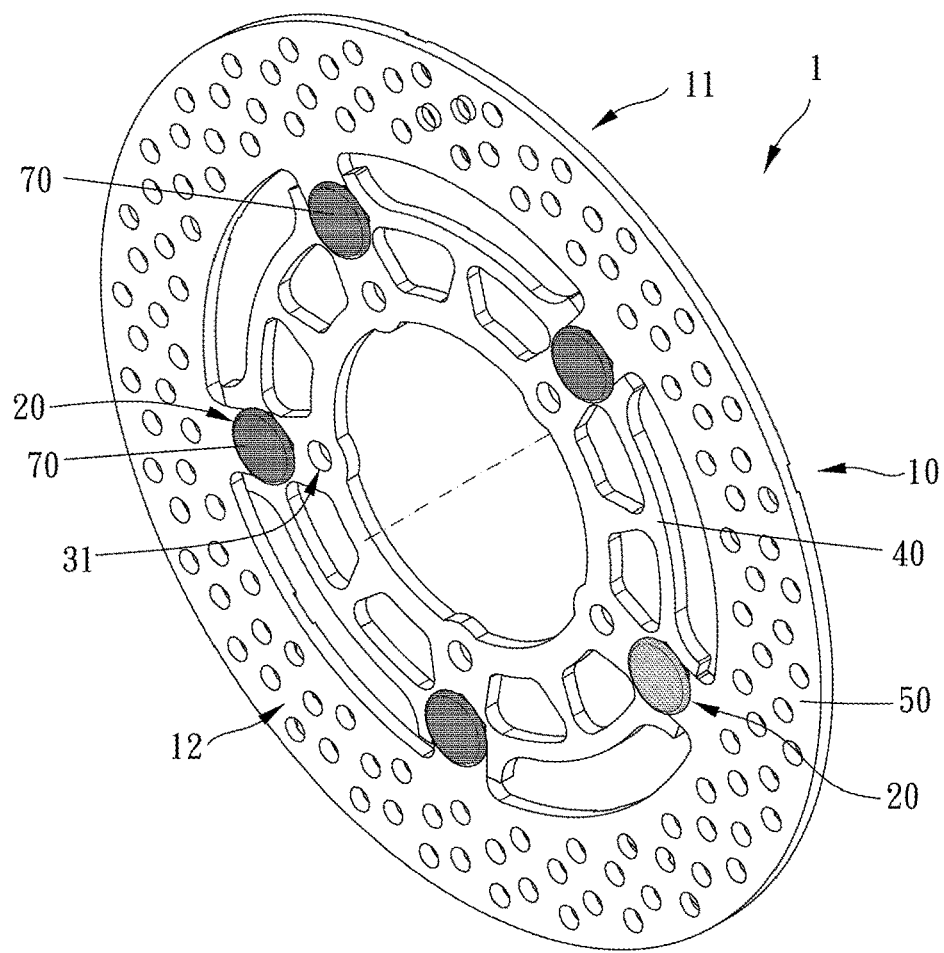
FIG. 1 is a perspective drawing of a preferred embodiment of the present invention.
Figure 2:
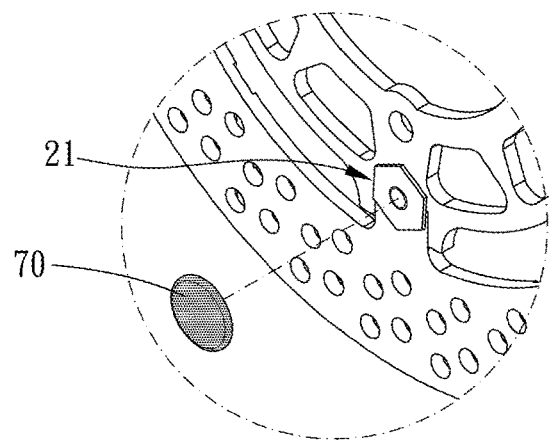
FIG. 2 is a partial drawing showing the preferred embodiment of the present invention.
Figure 3:
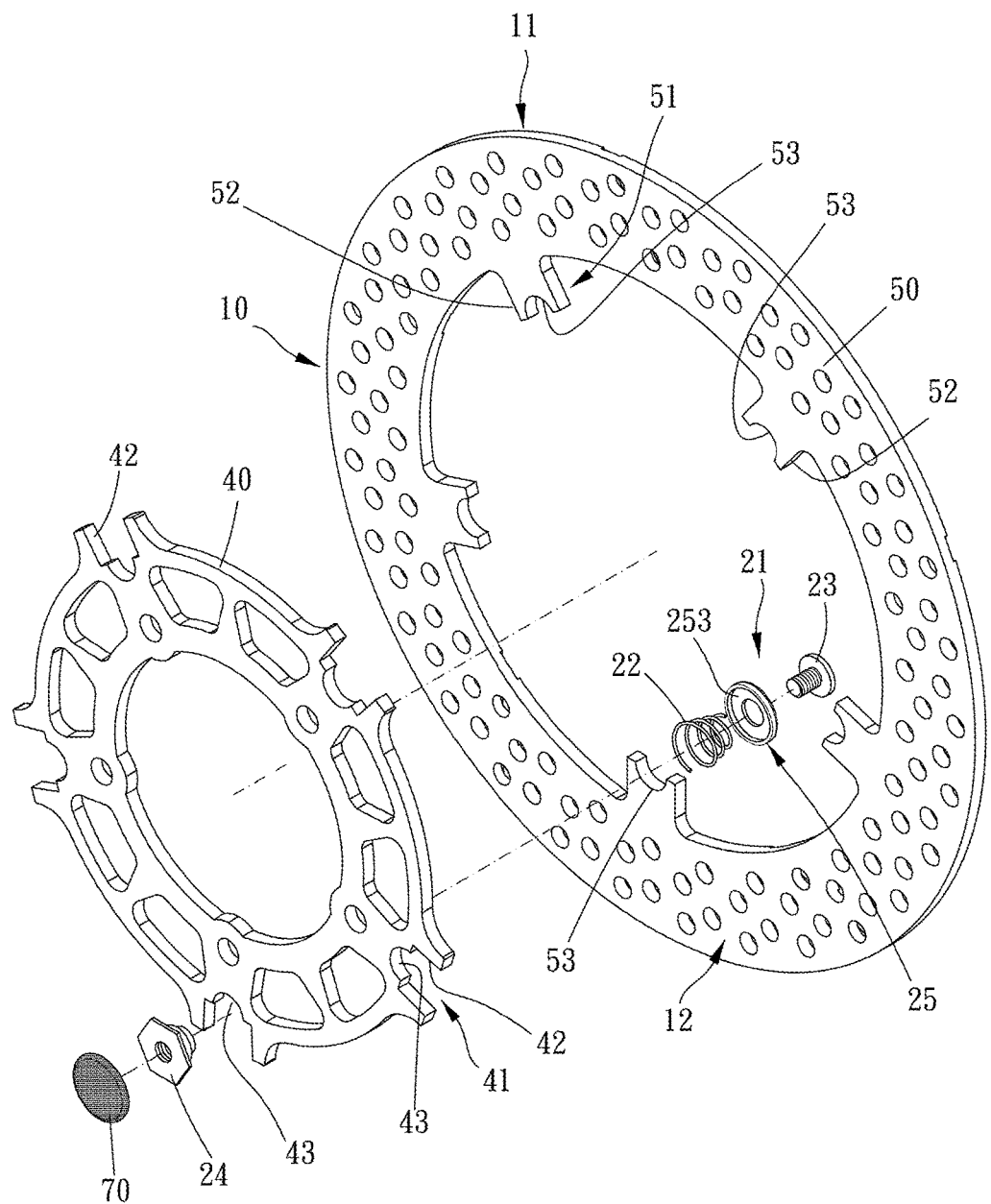
FIG. 3 is a breakdown drawing of the preferred embodiment of the present invention.
Figure 6:
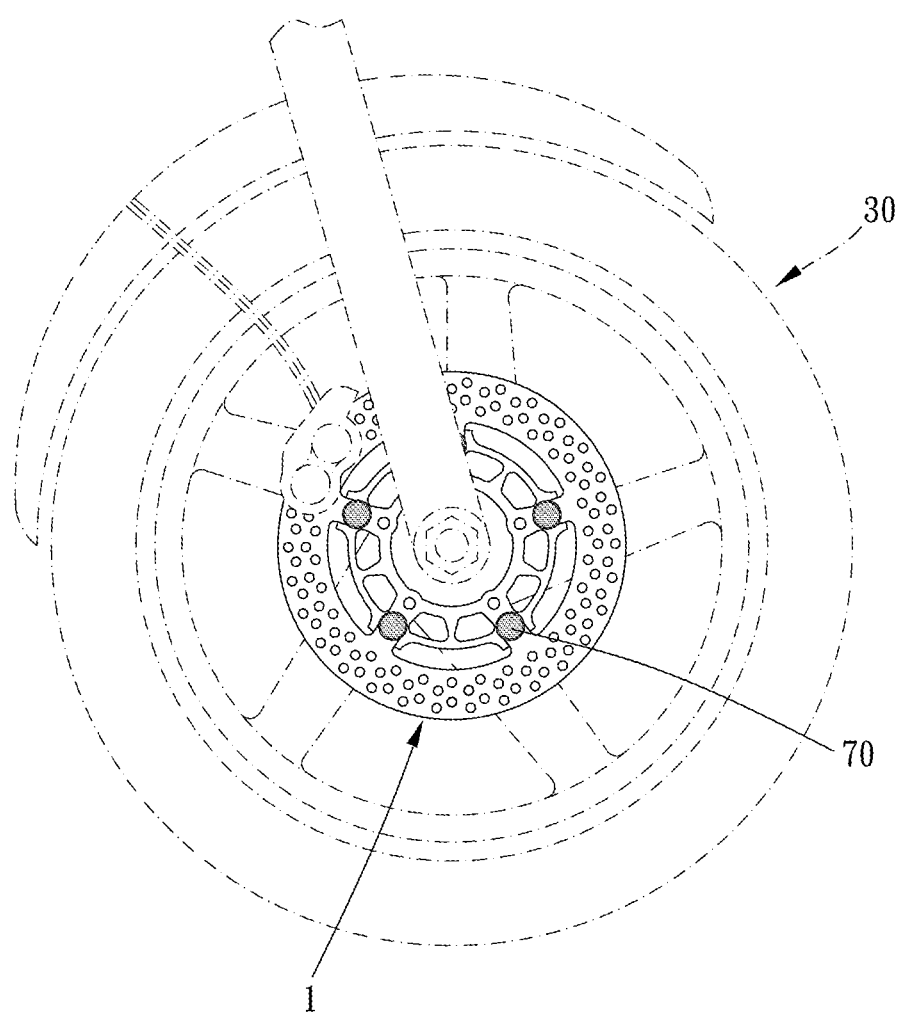
FIG. 6 is a drawing showing the preferred embodiment of the present invention in use.

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A brake disk 1 includes a disk portion 10 and at least two connecting assemblies 20.

The disk portion 10 has a first side face 11 and a second side face 12 facing opposite to the first side face 11. The first side face 11 is for being assembled with a wheel 30 and facing the wheel 30, and the wheel 30 may be a part of a bicycle or a part of a motorcycle. The disk portion 10 includes an inner annular member 40 and an outer annular member 50. Specifically, the inner annular member 40 is circumferentially formed with a first assembling mechanism 41, and the outer annular member 50 has a second assembling mechanism 51. The first assembling mechanism 41 and the second assembling mechanism 51 are correspondingly connected with each other to connect the inner and outer annular members 40, 50.

Furthermore, the first assembling mechanism 41 includes a plurality of recesses 42 radially formed thereon, and the recesses 42 are annularly arranged on the inner annular member 40 in intervals. The second assembling mechanism 51 includes a plurality of protrusions 52 radially formed thereon, and the protrusions 52 correspond to the recesses 42 and are engaged with each other. Specifically, the first and second assembling mechanisms 41, 51 are radially engaged with each other and non-movable relative to each other tangently. However, in other embodiments, the first assembling mechanism 41 and the second assembling mechanism 51 may respectively have a protrusively formed structure, a recessively formed structure or other structures which are engageable with each other.

In this embodiment, the first assembling mechanism 41 and the second assembling mechanism 51 can be assembled with each other, respectively, to form a plurality of connecting holes 60. For example, in this embodiment, the first assembling mechanism 41 may include a plurality of first arched portions 43 recessively formed thereon, and the second assembling mechanism 51 may include a plurality of second arched portions 53 recessively formed thereon. Each said arched portion 43 corresponds to each said second arched portion 53, and each said first arched portion 43 and each said second arched portion 53 define the connecting hole 60. It is to be noted that one side of each said first arched portion 43 and one side of each said second arched portion 53 are disposed on a same plane by the first side face 11, and an other side of each said first arched portion 43 and an other side of each said second arched portion 53 are disposed on a same plane by the second side face 12.

The connecting assemblies 20 include a fixation portion 21 and a helical spring 22 surrounding the fixation portion 21 respectively, and each said fixation portion 21 is connected with the first assembling mechanism 41 and the second assembling mechanism 51. Specifically, the fixation portion 21 is disposed through the helical spring 22, the first assembling mechanism 41 and the second assembling mechanism 51, and two opposite sides of the helical spring 22 abut against the first side face 11 at an end of the connecting hole 60 and an end of the fixation portion 21 respectively. More specifically, each said connecting assembly 20 is assembled to each said connecting hole 60, the fixation portion 21 is disposed through the connecting hole 60, each said helical spring 22 is located on the first side face 11 and abuts against between the fixation portion 21 and the first side face 11, and a side of the helical spring 22 abuts against both the first arched portion 43 and the second arched portion 53.

In this embodiment, the fixation portion 21 may include a bolt member 23, a nut member 24 and a spacing member 25. The bolt member 23 and the nut member 24 may be disposed through the first assembling mechanism 41 and the second assembling mechanism 51 and fixedly screwed to each other. More specifically, the bolt member 24 may include an abutting portion 241, a body portion 242 and a surrounded portion 243. The body portion 242 is disposed through the first and second assembling mechanisms 41, 51, and the body portion 242 is substantially fittingly engaged with the first and the second assembling mechanisms 41, 51. The abutting portion 241 abuts against the second side face 12. The nut member 24 may be formed with an inner threaded portion 244, and the bolt member 23 may be formed with an outer threaded portion 231. The bolt member 23 can be fixedly screwed to the nut member 24 through the inner and outer threaded portions 244, 231 being screwed to each other.

The helical spring 22 and the spacing member 25 are disposed around the surrounded portion 243 and are sandwiched between the bolt member 23 and the first side face 11. Furthermore, the spacing member 25 is disposed around the bolt member 23 and the nut member 24 and located on the first side face 11, and the helical spring 22 abuts against between the spacing member 25 and the first side face 11. Specifically, the spacing member 25 has a bottom wall 251 and a circumferential wall 252 connected with the bottom wall 251, and the bottom wall 251 and the circumferential wall 252 define a receiving space 253 so that the helical spring 22 can be received in the receiving space 253.

The connecting assembly 20 further includes an identification portion 70, and the identification portion 70 is fixedly disposed on the fixation portion 21 and located on the second side face 12. For example, the identification portion 70 may be fixedly stuck on a side of the abutting portion 241, and the identification portion 70 may have colors or be printed with texts or patterns; therefore, through the identification portion 70, misassembling can be prevented.

In actual practice, the inner annular member 40 has an assembling portion 31 and is for being assembled with the wheel 30, and the outer annular member 50 is for a caliper device to clip thereon. The inner and outer annular members 40, 50 repositionably move relative to each other through the helical spring 22 which abuts against between the first and second assembling mechanisms 41, 51. When the caliper device clips on the outer annular member 50, the outer annular member 50 can move relative to the inner annular member 40 to allow the inner and outer annular members 40, 50 to float. Preferably, compared with a conventional wave spring, the two opposite sides of the helical spring 22 have greater supporting area to elevate stability, and the helical spring 22 has preferable structural strength and elasticity;

therefore, when the helical spring 22 is applied to the brake disk 1, the brake disk 1 has preferable floating effect.

It is to be noted that a side of an inner annular member 40 and a side of an outer annular member 50 are on a same plane by the first side face 11, and an other side of the inner annular member 40 and an other side of the outer annular member 50 are disposed on a same plane by the second side face 12 so as to decrease a thickness of the brake disk 1. In addition, the helical spring 22 abuts against a same side of the inner and outer annular members 40, 50 to achieve floating effect. The helical spring 22 may be a cylindrical coil spring or a conical coil spring, and the conical spring which is tapered toward a direction can further decrease a volume after being compressed. Furthermore, the bolt member 23, the spacing member 25 and the helical spring 22 disposed on the first side face 11 face inwardly toward the wheel 30 so as to prevent from being rusted and damaged due to dust or water from outside. The spacing member 25 can further protect the helical spring 22 and restrain a movement of the helical spring 22. The identification portion 70 fixedly disposed on the second side face 12 can also protect the fixation portion 21.

Specifically, the inner annular member 40 and the outer annular member 50 are axially movable relative to each other, and the first assembling mechanism 41 and the second assembling mechanism 51 have substantially equal thicknesses. The helical spring 22 is a conical coil spring, and a bottom coil of the helical spring 22 continuously abuts against the first assembling mechanism 41 of the inner annular member 40 and the second assembling mechanism 51 of the outer annular member 50 on a same plane. The connecting assembly 20 includes an abutting portion 241 and a cap portion 254, the abutting portion 241 abuts against the second side face 12, the cap portion 254 is located by the first side face 11 and includes a bottom wall 251 and a circumferential wall 252 annularly connected with the bottom wall 251, the circumferential wall 252 extends toward the first side face 11 and defines a receiving space 253, and the circumferential wall 252 is distanced apart from the first side face 11. The spacing member 25 includes the cap portion 254, the conical coil spring has a coil diameter smaller than a depth of the receiving space 253, and when the circumferential wall 252 abuts against the first side face 11, at least top coil of the conical coil spring does not contact the first side face 11. The conical coil spring is tapered toward the bottom wall 251 and partially seated within the receiving space 253, the conical coil spring is partially radially restrictable by the circumferential wall 252, and coils of the conical coil spring do not overlap axially. Preferably, the coil diameter of the conical coil spring is 0.5 mm to 3.0 mm, and the conical coil spring includes 3 to 7 coils, it depends on various requirements of various brake disks. Two end of the conical coil spring preferably terminate at diametrical sides of the conical coil spring, thus providing balancing force respectively on the first and second side faces 11, 12 and avoiding slippage of the conical coil spring. The cap portion 254 and the nut member 24 may be integrally formed of one piece. The cap portion 254 can block out dust, particles or the like, and protect the conical coil spring.

Preferably, a gap 80 between an end face 255 of the circumferential wall 252 and the first side face 11 is smaller than the coil diameter, and the end face 255 of the circumferential wall 252 faces the first side face 11. The body portion 242 extends from the abutting portion 241, the surrounded portion 243 extends from the body portion 242, and the surrounded portion 243 is protrusive beyond the first side face 11. The cap portion 254 further includes a through hole 256 which is sized to be equal to or larger than the surrounded portion 243, and the surrounded portion 243 is insertable into the through hole 256, and the end face 255 of the circumferential wall 252 is abuttable against the first side face 11. The body portion 242 is aligned with the first side face 11. It is noted that the spacing member 25 is axially movable relative to the bolt member 23 and the nut member 24 and that the bolt member 23 and the nut member 24 can approach each other by relatively screwing them. As a result, the conical coil spring can be depressed to have sufficient elastic force as required for acting on the inner and outer annular members 40, 50, and it allows various conical coil springs which have different coils as long as the bolt member 23 and the nut member 24 are screwed to approach or be distanced away from each other.

Figure 7:
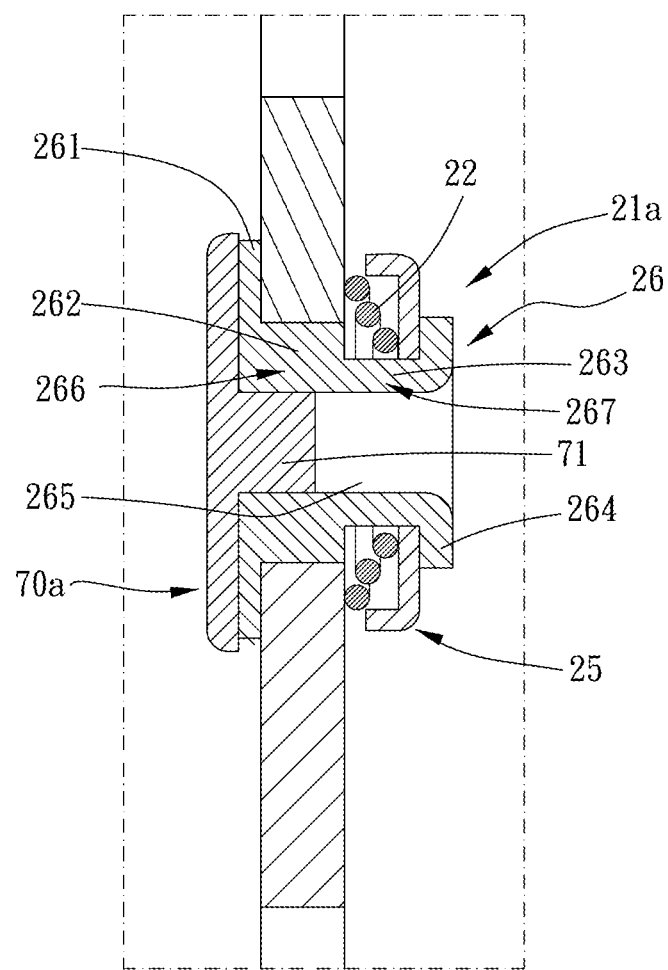
FIG. 7 is a drawing showing another embodiment of the present invention.

In another embodiment as shown in FIG. 7, an fixation portion 21a includes a rivet member 26. The rivet member 26 is disposed through the first assembling mechanism, the second assembling mechanism, the helical spring 22 and the spacing member 25, and two ends of the rivet member 26 fixedly rivet the first assembling mechanism, the second assembling mechanism, the helical spring 22 and the spacing member 25. Specifically, the rivet member 26 includes an abutting portion 261, a body portion 262 and a surrounded portion 263. The body portion 262 is disposed the first and second assembling mechanisms, the abutting portion 261 abuts against the second side face, and the helical spring 22 and the spacing member 25 are disposed around the surrounded portion 263. The rivet member 26 includes a restraining portion 264, and the restraining portion 264 may be pressed to deform so as to be restrictedly attached to a side of the spacing member 25.

The rivet member 26 is formed with a through hole 265 along an axial direction thereof, the body portion 262 has a first wall thickness 266, and the surrounded portion 263 has a second wall thickness 267. It is to be noted that the first wall thickness 266 is equal to or greater than the second wall thickness 267 so that the body portion 262 has preferable structural strength. The rivet member 26 is disposed between the first and second assembling mechanisms to support the first and second assembling mechanisms. An identification portion 70a may be protrusively formed with a protrusive portion 71, and the protrusive portion 71 is engaged with an end of the through hole 265. However, in other embodiments, the rivet member 26 may be solid and has preferable structural strength.

Given the above, members of the brake disk are disposed inwardly to prevent the members from being rusted and damaged due to the dust or water from outside. In addition, a side of an inner annular member and a side of an outer annular member are on a same plane by the first side face, and the other side of the inner annular member and the other side of the outer annular member are disposed on a same plane by the second side face so as to decrease a thickness of the brake disk; the helical spring may be the conical coil spring to further decrease the volume of the brake disk after the conical coil spring is compressed; the helical spring may abut against the same side of the inner and outer annular members to float, and the helical spring has greater supporting area and flexibility to float stably and elastically; the helical spring may be received in the spacing member to be position-restricted and protected; and the brake disk has the identification portion to prevent misassembling.

While we have shown and described various embodiments in accordance with the present invention, it should be clear to those skilled in the art that further embodiments may be made without departing from the scope of the present invention.

What is claimed is:

1. A brake disk, including:
a disk portion, having a first side face and a second side face facing opposite to the first side face, the first side face for being assembled with a wheel and facing the wheel, the disk portion including an inner annular member and an outer annular member, the inner annular member being circumferentially formed with a first assembling mechanism, the outer annular member having a second assembling mechanism, the first assembling mechanism and the second assembling mechanism being correspondingly connected with each other, the inner annular member and the outer annular member being axially movable relative to each other, the first assembling mechanism and the second assembling mechanism having substantially equal thicknesses;
at least two connecting assemblies, being connected with the first assembling mechanism and the second assembling mechanism respectively, each said connecting assembly including a helical spring, the helical spring being on the first side face and abutting against between the connecting assembly and the first side face, the helical spring is a conical coil spring, a bottom coil of the helical spring continuously abutting against the first assembling mechanism of the inner annular member and the second assembling mechanism of the outer annular member on a same plane;
wherein the connecting assembly includes an abutting portion and a cap portion, the abutting portion abuts against the second side face, the cap portion is located by the first side face and includes a bottom wall and a circumferential wall annularly connected with the bottom wall, the circumferential wall extends toward the first side face and defines a receiving space, the circumferential wall is distanced apart from the first side face;
wherein the conical coil spring has a coil diameter smaller than a depth of the receiving space, the conical coil spring is tapered toward the bottom wall and partially seated within the receiving space;
wherein a gap between an end face of the circumferential wall and the first side face is smaller than the coil diameter, and the end face of the circumferential wall faces the first side face;
wherein the connecting assembly further includes a body portion extending from the abutting portion and a surrounded portion extending from the body portion, the body portion is disposed through the first and second assembling mechanisms, and the surrounded portion is protrusive beyond the first side face;
wherein the cap portion further includes a through hole which is sized to be equal to or larger than the surrounded portion, the surrounded portion is insertable into the through hole, and the end face of the circumferential wall is abuttable against the first side face.

2. The brake disk of claim 1, wherein the first assembling mechanism includes a plurality of recesses radially formed thereon, the recesses are annularly arranged on the inner annular member in intervals, the second assembling mechanism includes a plurality of protrusions radially formed thereon, and the protrusions correspond to the recesses and are engaged with each other.

3. The brake disk of claim 1, wherein the first assembling mechanism and the second assembling mechanism are assembled with each other, respectively, to from a plurality of connecting holes, and each said connecting assembly is correspondingly assembled to each said connecting hole.

4. The brake disk of claim 3, wherein the first assembling mechanism includes a plurality of first arched portions recessively formed thereon, the second assembling mechanism includes a plurality of second arched portions recessively formed thereon, each said first arched portion corresponds to each said second arched portion to form the connecting hole, one side of each said first arched portion and one side of each said second arched portion are disposed on a same plane by the first side face, and an other side of each said first arched portion and an other side of each said second arched portion are disposed on a same plane by the second side face.

5. The brake disk of claim 4, wherein the connecting assembly is disposed through the connecting hole, two opposite sides of the helical spring abut against the first side face at an end of the connecting hole and an end of the connecting assembly respectively, and one of the two sides of the helical spring abuts against both the first arched portion and the second arched portion.

6. The brake disk of claim 1, wherein the connecting assembly includes a bolt member, a nut member and a spacing member, the spacing member includes the cap portion, the bolt member and the nut member are disposed through the first assembling mechanism and the second assembling mechanism and fixedly screwed to each other, the spacing member is disposed around the bolt member and the nut member and located on the first side face, and the helical spring abuts against between the spacing member and the first side face.

7. The brake disk of claim 6, wherein the spacing member is axially movable relative to the bolt member.

8. The brake disk of claim 1, wherein the connecting assembly further includes an identification portion and a fixation portion, the fixation portion is disposed through the helical spring, the first assembling mechanism and the second assembling mechanism, and the identification portion is fixedly assembled on the fixation portion and located on the second side face.

9. The brake disk of claim 6, wherein the nut member includes the abutting portion, the body portion is substantially fittingly engaged with the first and second assembling mechanisms, and the helical spring and the spacing member are disposed around the surrounded portion and restrictedly sandwiched between the bolt member and the first side face.

10. The brake disk of claim 1, wherein the coil diameter of the conical coil spring is 0.5 mm to 3.0 mm.

11. The brake disk of claim 1, wherein the conical coil spring is partially radially restrictable by the circumferential wall.

12. The brake disk of claim 1, wherein the conical coil spring includes 3 to 7 coils.

13. The brake disk of claim 1, wherein when the circumferential wall abuts against the first side face, at least top coil of the conical coil spring does not contact the first side face.

14. The brake disk of claim 1, wherein two end of the conical coil spring terminate at diametrical sides of the conical coil spring.

15. The brake disk of claim 1, wherein the body portion is aligned with the first side face.

* * * * *